United States Patent [19]
Krohn et al.

[11] 3,997,250
[45] Dec. 14, 1976

[54] HIGH STRENGTH OPHTHALMIC LENS

[75] Inventors: David A. Krohn; Robert E. Graf, both of Southbridge, Mass.; Emil W. Deeg, Woodstock, Conn.

[73] Assignee: American Optical Corporation, Southbridge, Mass.

[22] Filed: July 2, 1975

[21] Appl. No.: 592,703

[52] U.S. Cl. .............................. 351/166; 106/47 Q; 106/52; 428/410; 65/30 E; 351/168
[51] Int. Cl.² .......................................... G02B 5/28
[58] Field of Search ........... 106/47 Q, 52; 428/410; 65/30 E; 427/165, 169; 351/166

[56] References Cited
UNITED STATES PATENTS

| | | | |
|---|---|---|---|
| 3,533,888 | 10/1970 | Eppler et al. | 351/166 |
| 3,790,260 | 2/1974 | Boyd et al. | 351/166 |
| 3,898,093 | 8/1975 | Faulstich et al. | 106/54 |
| 3,899,315 | 8/1975 | Siegmund | 65/31 |
| 3,923,486 | 12/1975 | Kitano et al. | 65/30 E |

Primary Examiner—Helen M. McCarthy
Attorney, Agent, or Firm—H. R. Berkenstock, Jr.; William C. Nealon

[57] ABSTRACT

An ophthalmic glass lens having a compressively stressed surface zone after ion exchanging which is at least 60 micrometers in depth can be formed from an alkali metal oxide silicate glass comprising by weight about 4 to about 15 percent sodium oxide, about 3 to about 15 percent potassium oxide provided the total amount of sodium, potassium and other alkali metal oxides is up to about 20 percent and about 3 to about 15 percent lanthanum oxide. The ion exchange process can take place at a temperature either above or below the strain point of conventional ophthalmic crown glass to produce satisfactory physical properties in the ophthalmic glass lens.

3 Claims, No Drawings

HIGH STRENGTH OPHTHALMIC LENS

BACKGROUND OF THE INVENTION

1. Field of the Invention:

This invention is in the field of chemical ion exchange treatment of a silicate glass to develop strength by compressively stressing a surface layer of the glass. Potassium ions are introduced into said surface layer in exchange for sodium ions.

2. Description of the Prior Art:

It is known to strengthen a glass article containing sodium ions by contact with a molten salt containing alkali metal ions having a diameter greater than that of the sodium ions in the glass. Where potassium ions are substituted for the sodium ions, a compressive stress is developed in the surface layer of the glass article as disclosed in the *Journal of the American Ceramic Society*, Vol. 45, No. 2 (February 1962) pgs. 59–68. In the process described in the above article, ion exchange was conducted at a temperature below the strain point of the glass so as to inhibit molecular re-arrangement and viscous flow during ion exchange of the monovalent metal ions migrating into the glass surface. The larger ions from the molten salt in effect are squeezed into sites originally occupied by the smaller alkali metal ions. The compressive stress set up by this crowding effect substantially increases the impact strength of the glass.

In an article entitled "Strengthening by Ion Exchange" in the *Journal of the American Ceramic Society*, Vol. 47, No. 5, May 1964, pgs. 215–219, glasses are described which contain substantial amounts of aluminum oxide or zirconium oxide. These glasses are said to be uniquely capable of having strength imparted thereto by an ion exchange process conducted below the strain point of the glass. Such glasses also maintain high strength subsequent to being abraded to simulate ordinary usage.

Ion exchange treatment of alkali metal silicate glasses has been conducted at temperatures above the strain point of the glass as well as below the strain point of the glass. In one method of chemical strengthening described in U.S. Pat. No. 2,799,136, a silicate glass containing exchangeable potassium or sodium ions is treated at a temperature above its strain point with a source of lithium ions, for example, a molten lithium salt. The lithium ions migrate into the glass in exchange for potassium or sodium ions which migrate out into the lithium salt. During the exchange process, molecular re-arrangement occurs in the glass since exchange takes place at a temperature above the strain point of the glass. The smaller lithium ions form a new surface layer on the glass having a lower coefficient of expansion than the original glass. As the article cools, compressive stresses are set up by differential thermal expansion.

In copendng application Ser. No. 390,742, now abandoned, assigned to the Assignee of the instant invention, a process is disclosed for treating an alkali metal silicate ophthalmic glass by an ion exchange process utilizing a molten bath of potassium nitrate at a temperature ranging from 760° F to 960° F. This latter temperature is above the strain point of this ophthalmic glass but is well below the softening point of the glass. The process has the advantage that a shorter ion exchange period is thereby made feasible.

Comparison results obtained in high temperature and low temperature ion exchange processes indicate that the low temperature ion exchange process, that is, one conducted at a temperature below the strain point of the glass results in a glass having a stressed surface layer which is normally relatively shallow and that in order to obtain deeper penetration, longer treatment times are required. In the high temperature ion exchange process, that is, one using temperatures above the strain point of the glass, a stressed layer is obtained which is normally relatively deep in comparison to stressed layers obtained by the low temperature ion exchange process. Presumably because molecular re-arrangement can take place, lower compressive stresses are obtained in the stressed layer of the glass.

Because a strengthened ophthalmic lens to be capable of providing satisfactory service must not only resist breakage by impact when the lens is newly produced but also as a practical matter must provide resistance to impact even after the lens surfaces have been abraded as will occur from handling and cleaning both in production and by the user, it has been found that the depth of penetration is at least of equal importance in comparison to the desired improvement in compressive stress and of much greater importance once a reasonable level of about 15,000 to about 20,000 psi compressive stress is attained by ion exchange.

U.S. Pat. No. 3,790,260 provides recognition of the importance of depth of penetration of the compressively stressed surface layer neutral zone as a means of providing a satisfactory ophthalmic lens which will provide resistance to lens breakage even after abrasion as a result of normal use. The high strength ophthalmic lens disclosed in U.S. Pat. No. 3,790,260 is obtained by limiting the lime content of the glass composition since it has been found that the inclusion of calcium oxide has a deleterious effect upon the strength after abrading because of a reduction in the depth of the compressively stressed surface layer and, therefore, inclusion of only very minor amounts of lime up to about 3 percent can be tolerated without destroying the desired strength of the lens.

Typically, the ophthalmic glass industry has been employed soda-lime-silica glasses for the production of ophthalmic lenses in which 8–15 percent lime (calcium oxide) is included. The lime-type glass has usually been preferred because of the ready availability of high purity raw materials at relatively low cost and because calcium oxide is needed to maintain good melting, forming and processing properties in the glass.

Therefore, it has become desirable to develop a relatively inexpensive, reliable method of deepening the compressively stressed surface layer obtained by the ion exchange process of strengthening an ophthalmic lens. By the process of the present invention, a strengthened ophthalmic lens composition can be obtained utilizing either a treating temperature above or below the glass strain point. At the same time, it is desirable to provide a compressive stress value at the surface of the ophthalmic glass lens of at least about 15,000 psi. to about 20,000 psi. The present invention fulfills these needs and provides various other advantages as will become apparent from the following description of the invention.

SUMMARY OF THE INVENTION

Conventional silicate-based ophthalmic crown glass lenses suitable for ion exchange strengthening contain besides alkali metal oxides such as sodium and potassium oxides, metal oxides such as zinc oxide, calcium oxide, magnesium oxide and titanium dioxide as well as trivalent metallic oxides such as aluminum and boron oxides. It has now been discovered that lanthanum oxide can be used to replace all or part of any of these metallic oxides in the preparation of an ophthalmic silicate-based glass lens which is especially suitable for further processing to improve the strength of the lens as indicated by increased surface compression and depth of penetration. In addition, suitable silicate-based glass compositions can be prepared by utilizing a glass comprising zinc oxide in combination with lanthanum oxide, cadmium oxide or barium oxide.

The chemical ion exchange process of the invention can be conducted at a temperature either above or below the strain point of conventional ophthalmic crown glass. It has been found that lanthanum oxide in such glasses promotes rapid attainment of satisfactory depth of the ion-exchanged layer when used as a partial or total replacement for zinc oxide which also functions in such glasses to increase the depth of the neutral zone upon ion exchanging. As a partial replacement for lanthanum oxide, cadmium or barium oxide or mixtures thereof can be used in amounts up to about 5 percent each in combination with up to about 15 percent by weight of zinc oxide provided the total cadmium, barium and lanthanum oxide content, by weight, is about 3 to about 20 percent.

DESCRIPTION OF THE PREFERRED EMBODIMENTS

Traditionally, the ophthalmic glass industry has employed modified soda-lime-silica glasses for the production of ophthalmic lenses. In general, the soda-lime-silica glasss of the prior art contain 55–75 percent silicon dioxide, 15–20 percent of a combination of sodium oxide and potassium oxide and 8–15 percent lime with up to 2 percent aluminum oxide together with the usual minor amounts of fining agents and colorants as required. It is known to utilize divalent metal oxides other than lime such as zinc, or titanium dioxide for the purpose of adjusting the refractive index but the use of lime in an ophthalmic glass has usually been preferred because of the ready availability of lime at high purity and relatively low cost.

The compositions of the invention provide an ophthalmic glass suitable for making a high strength ophthalmic lens by the process of chemical ion exchange subsequent to casting, grinding, polishing and edging a lens blank. It has been found that an ophthalmic glass composition in which lanthanum oxide is utilized is especially suitable for further treatment to strengthen the glass by a chemical ion exchange process.

Chemically ion-exchanged glass lenses made using the glass compositions of the invention can be suitable strengthened so that the depth of the ion-exchanged surface zone (measured as the depth of the neutral zone) is at least 60 to about 110 micrometers in depth. Preferably, depth is about 80 to about 150 micrometers and higher. It is believed that for adequate retention of strength the neutral zone must be at least 60 micrometers in depth in order to retain strength under the abrasive conditions experienced in normal use by the wearer. For instance, it has been found that a lens blank capable of withstanding the impact of a ⅝ inch steel ball dropped from a distance of 200 inches onto the convex surface of the lens can be prepared by an ion exchange process conducted either at a temperature above the strain point of the glass as further described in copending application Ser. No. 390,742 filed Aug. 23, 1973 and assigned to the Assignee of the instant invention or at a temperature below the strain point of the glass as is further described in U.S. Pat. No. 3,790,260, both hereby incorporated by reference.

In general, the chemical ion exchange treatment can be conducted above the strain temperature of conventional ophthalmic glass by subjecting a lens to a bath of liquid potassium nitrate or potassium sulfate at a temperature above about 510° C which is above the strain point of ophthalmic crown glass but is well below the softening point of the glass. By subjecting the glass of the invention to ion exchange above rather than below the strain point of conventional ophthalmic glass, there is a tendency for greater penetration of the potassium ion into the surface of the glass so that a deeper compressively-stressed ion-exchanged surface zone is obtained in a shorter ion exchange period. Since some relaxation or molecular re-arrangement occurs during the ion exchange process at the temperature utilized above the strain point of conventional ophthalmic glass, the tendency is present for decreased development of compressive strength as measured by decreased modulus of rupture. However, it is believed that of the two parameters, depth of penetration and compressive strength at the surface, the attainment of sufficient depth of penetration of the conpressively-stressed layer is more important than the attainment of a particularly high surface compression provided a surface compression of at least about 15,000 psi. to about 20,000 psi. is attained. Under conditions of actual use where the compressively-stressed layer is relatively shallow, minute scratches can penetrate the compressively-stressed surface layer and thereby weaken the glass sufficiently so that it no longer exhibits higher strength as a result of the ion exchanging treatment.

The ion exchange treatment at a temperature below the strain point of ophthalmic crown glass is further described in U.S. Pat. No. 3,790,260 and involves exchange at temperatures from 20° C to 120° C below the strain point with the proviso that the temperature at which the ion exchange is conducted must be at least about 350° C. A usual treatment in molten potassium nitrate is for a period of 16 hours at a temperature of about 450° C.

The glass compositions of the invention can be made at a suitable refractive index in addition to providing especially desirable compositions which are suitable for chemical ion exchanging. In general, ophthalmic crown glass is required to have a refractive index in the range of about 1.515 to about 1.530. The accepted industry standard for refractive index is presently 1.523. The glass of the invention has a refractive index within the above range.

Generally, the glass compositions can contain the following proportions of ingredients in percent by weight:

| Ingredient | Percent by Weight |
| --- | --- |
| sodium oxide | about 4 to about 15 |
| potassium oxide | about 3 to about 15 |
| Other Alkali Metal Oxides: | |
|   lithium oxide | up to about 5 |
|   rubidium oxide | up to about 5 |
|   cesium oxide | up to about 5 |
| lanthanum oxide | up to about 20 |
| aluminum oxide | up to about 5 |

-continued

| Ingredient | Percent by Weight |
| --- | --- |
| zirconium oxide | up to about 5 |
| zinc oxide | up to about 15 |
| titanium oxide | up to about 5 |
| magnesium oxide | up to about 4 |
| boron oxide | up to about 2 |
| cadmium oxide | up to about 5 |
| barium oxide | up to about 5 |
| Total ZnO + MgO | up to about 15 |
| Total Na$_2$O + K$_2$O and other alkali metal oxides | about 12 to about 20 |
| Total La$_2$O$_3$ + CdO + BaO | about 3 to about 20 |
| Total ZnO + BaO + CdO | about 8 to about 15 |
| Total MgO + Al$_2$O$_3$ | about 0.2 to about 5 |
| Fining Agents (antimony oxide, cerium oxide, arsenic oxide and mixtures thereof) | up to about 2 |
| silica | balance |

The preferred embodiments of the glass to be strengthened are within the weight compositional limits indicated below:

| Ingredient | Percent by Weight |
| --- | --- |
| sodium oxide | about 7 to about 10 |
| potassium oxide | about 7 to about 11 |
| lanthanum oxide | about 3 to about 15 |
| aluminum oxide | about 0.2 to about 4 |
| zinc oxide | up to about 4 |
| titanium oxide | up to about 5 |
| magnesium oxide | up to about 4 |
| Fining Agents (antimony oxide, cerium oxide, arsenic oxide and mixtures thereof) | up to about 2 |
| silica | balance |

An insufficient content of silicon dioxide will cause easy devitrification and make the forming of the ophthalmic lens difficult. However, a silicon dioxide content that is too high causes the glass to become hard with attendant difficulty in melting and forming. The silicon dioxide content should be about 60 to about 68 percent by weight preferably about 62 to about 66 percent by weight.

Aluminum oxide has been traditionally used either alone or in combination with zirconium oxide in glass which is to be ion exchanged since the degree of strengthening attainable has been found to be considerably enhanced in the present of substantial amounts of these oxides. For instance, in U.S. Pat. No. 3,533,888, there is disclosed that when 5–25 percent aluminum and/or zirconium oxide is present in a glass which is to be chemically ion exchanged, a glass which is particularly suitable for chemical ion exchange treatment is obtained. It is, therefore, particularly unexpected that a lanthanum oxide-containing glass as herein disclosed will provide an ophthalmic glass lens having suitable strength subsequent to an ion exchanging process conducted at a temperature either above or below the strain point of the glass. Aluminum oxide need not be included to enhance ion exchange strengthening but is desirable utilized in the glass compositions of the invention in amounts of about 0.2 percent to about 4 percent by weight to provide satisfactory glass durability. That is, resistance to erosion under the influence of moisture, acids and alkalies.

Zinc oxide, calcium oxide, magnesium oxide, lead oxide, cadmium oxide or strontium oxide have been traditionally used in glass to be ion exchanged in individual amounts exceeding 1 percent by weight in order to improve the melting property of the glass and provide a glass exhibiting a viscosity curve which indicates that it is especially suitable for glass forming. It is generally desired that the combined total of zinc oxide and magnesium oxide used in the glass compositions of the invention be in the proportion of up to about 15 percent by weight. While zinc oxide has been found superior to the other divalent ions listed above in promoting the ion exchange rate, it has been found that the preferred compositions of the invention need not utilize any of these divalent ions in the glass either to improve the melting property of the glass or to increase the ion exchange rate. In accordance with the invention, lanthanum oxide has been found to be a satisfactory substitute therefor. It not only acts to improve the melting property of the glass but provides an increase in the ion exchange rate. In one embodiment of the invention, up to about 15 percent by weight of zinc oxide can be utilized in combination with lanthanum oxide together with up to about 5 percent by weight cadmium oxide and up to 5 percent by weight barium oxide provided the total of lanthanum oxide, cadmium oxide and barium oxide is about 3 to about 20 percent by weight.

Boron oxide is also known to be helpful in controlling the viscosity curve of the glass without causing an excessive rise of the liquidus temperature. In the ophthalmic lens compositions of the invention, boron oxide can be utilized as an optional ingredient but its presence in the glass is not required.

In carrying out the chemical ion exchange treating process with a potassium salt, a typically used salt such as potassium nitrate can be replaced by potassium sulfate or a mixture thereof with potassium nitrate and satisfactory results can also be obtained by applying a paste consisting of a mixture of an inert solid material such as clay and a potassium salt to the surface of the glass article and then heating the glass article.

One disadvantage of the prior art ion exchange process when conducted at a temperature below the strain temperature of the glass is that a relatively shallow compressively-stressed layer is produced and, therefore, unless the ion exchange treatment is carried on for a considerable period, preferably 16 hours or more, to obtain sufficient depth of the ion-exchanged surface layer, the advantage of the strengthening effect can be completely lost upon subjecting the ion-exchanged surface to even mild abrasive influences such as will inevitably occur during normal conditions of use. Certain embodiments of the glass compositions of the invention permit sufficient strength and depth of penetration of the ion-exchanged surface layer to be attained even after an ion exchange treatment time of 6 hours at a temperature below the strain point of the ophthalmic crown glass of the invention. In any case, whether the ion exchange treatment is conducted at a temperature above the strain point of the glass or below the strain point of the glass, it is believed that to provide a suitably strengthened ophthalmic lens which will retain its strength over normal conditions of use that the depth of the compressively-stressed surface layer must be at least 60 to about 110 micrometers, preferably about 80 to about 150 micrometers.

The following examples illustrate the various aspects of the invention but are not intended to limit it. Where not otherwise specified throughout the specification and claims, temperatures are given in degrees Centigrade and parts are by weight.

The glasses disclosed in the invention were made in platinum crucibles using standard glass-making techniques. Raw materials consisted of high-purity silica, aluminum hydroxide, magnesium oxide, nitrates and carbonates of sodium and potassium, titania, zinc oxide, lanthanum oxide, boric acid, arsenic and antimony oxides etc. All these components were thoroughly mixed prior to melting. In preparing the glasses, a platinum crucible with a 2.5 liter capacity was preheated at 1425° C in an electric furnace. The batch was then transferred to the crucible in 400–500 gram portions. After the crucible was sufficiently full, the temperature was raised to 1480° C for 3 hours. The melt was held at 1370° C for 16 hours and then stirred for 6 hours at 1340° C. The glass was subsequently cast into a sheet at that temperature, transferred to an annealing furnace and annealed according to the following procedure.

The glass was held at a temperature in the range of about 565° C for about one hour and then cooled at a rate of about 15° C to about 50° C per hour until the glass is at room temperature. Bars were then cut from this glass and subjected to an ion exchange treatment in a potassium nitrate bath for 6 hours at 510° C and 16 hours at 454° C. The former temperature is above the strain point of conventional ophthalmic crown glass and the latter temperature is below the strain point of said glass. Photoelastic analysis was accomplished using the following methods: The surface compression was measured on sheets of glass cut from said bars using a polarizing microscope equipped with a quartz wedge compensator. The depth of the compressive layer was measured using a polarizing microscope in a Friedel configuration together with a filar eyepiece.

EXAMPLES 1–5

Samples of the glasses shown in Table I below were prepared by melting silica sand, salts of sodium and potassium, lanthanium oxide etc. as listed in the proportions shown in Table I in a platinum crucible. After the cast sheet was annealed according to the above procedure, bars which were cut from the sheet were evaluated for physical properties which are shown in Table II and then ion exchanged at a temperature either above the strain point of conventional ophthalmic glass for 6 hours or at a temperature below said strain point for 16 hours at the temperature conditions shown in Table III below.

TABLE I

GLASS COMPOSITIONS FOR ION EXCHANGE

| Ingredients | Example 1 | Example 2 | Example 3 | Example 4 | Example 5 | (Control) Example 6 | (Control) Example 7 |
|---|---|---|---|---|---|---|---|
| $SiO_2$ | balance | balance | balance | balance | balance | balance | 63.7 |
| $Na_2O$ | 9.0 | 9.0 | 8.7 | 8.7 | 8.7 | 8.2 | 8.3 |
| $K_2O$ | 10.0 | 10.0 | 9.8 | 9.8 | 9.8 | 8.9 | 8.1 |
| CaO | — | — | — | — | — | 8.5 | — |
| MgO | — | — | 3.3 | 3.3 | 3.3 | — | 3.2 |
| $La_2O_3$ | 15.0 | 15.0 | 10.9 | — | — | — | — |
| CdO | — | — | — | 3.0 | — | — | — |
| BaO | — | — | — | — | 3.0 | — | — |
| $Al_2O_3$ | 0.2 | 2.5 | 2.5 | 2.5 | 2.5 | 1.9 | 3.0 |
| ZnO | — | — | — | 7.9 | 7.9 | 3.0 | 10.7 |
| $B_2O_3$ | — | — | 1.1 | 1.1 | 1.1 | — | 1.1 |
| $TiO_2$ | — | — | 1.2 | 1.2 | 1.2 | 0.5 | 1.1 |
| Fining Agents | | | | | | | |
| $Sb_2O_3$ | 0.25 | 0.25 | 0.25 | 0.25 | 0.25 | 0.5 | 0.5 |
| $As_2O_3$ | 0.25 | 0.25 | 0.25 | 0.25 | 0.25 | 0.5 | — |

TABLE II

PHYSICAL PROPERTIES OF GLASSES FOR ION EXCHANGE (PRIOR TO ION EXCHANGING)

| Physical Property | Example 1 | Example 2 | Example 3 | Example 4 | Example 5 | (control) Example 6 | Example 7 |
|---|---|---|---|---|---|---|---|
| Index of Refraction ($n_D$) | 1.525 | 1.527 | 1.529 | 1.525 | 1.524 | 1.523 | 1.523 |
| Strain Point (° C) | 497 | 484 | 510 | 488 | 496 | 500 | 499 |
| Softening Point (° C) | 727 | 746 | 747 | 723 | 722 | 731 | 735 |
| Coefficient of Expansion (° C × $10^6$) | 10.7 | 10.1 | 10.3 | 9.9 | 10.4 | 10.3 | 10.4 |

TABLE III

STRENGTH OF GLASS COMPOSITIONS AFTER ION EXCHANGE[1]

| Physical Property | Ex. 1 | Ex. 2 | Ex. 3 | Ex. 4 | Ex. 5 | (control) Ex. 6 | (control) Ex. 7 |
|---|---|---|---|---|---|---|---|
| Surface Compression (psi) | | | | | | | |
| a) After 16 hours at 454° C | 29,500 | 33,700 | 46,900 | 51,000 | 44,000 | 32,000 | 47,000 |
| b) After 6 hours at 510° C | 19,600 | 24,500 | 32,100 | 28,900 | 27,800 | 28,300 | 32,000 |
| Depth of Neutral Zone[2] (um) | | | | | | | |
| a) After 16 hours at 454° C | 163 | 151 | 98 | 93 | 85 | 64 | 96 |
| b) After 6 hours at 510° C | 150 | 140 | 112 | 101 | 102 | 53 | 97 |
| c) Percent Increase vs. Example 6 | a) 154 | a) 134 | a) 53 | — | — | — | — |

TABLE III-continued

| | STRENGTH OF GLASS COMPOSITIONS AFTER ION EXCHANGE[1] | | | | | | |
|---|---|---|---|---|---|---|---|
| Physical Property | Ex. 1 | Ex. 2 | Ex. 3 | Ex. 4 | Ex. 5 | (control) Ex. 6 | (control) Ex. 7 |
| (control) | b) 183 | b) 164 | b) 111 | — | — | — | — |

[1]KNO₃ bath.
[2]Indicates thickness of ion exchanged surface layer.

EXAMPLES 6 and 7
(controls)
representing no part of this invention

Prior art glasses were prepared of a conventional ophthalmic crown glass (Example 6) and a glass representative of that claimed in U.S. Pat. No. 3,790,260 (Example 7). These glasses were prepared, ion exchanged and evaluated using the same procedure described above. Compositions and test results are shown in Table I–III.

In addition, the glasses of Examples 6 and 7 were evaluated for resistance to breakage by the conventional Ball Drop Test after ion exchanging 16 hours at 454° C in a potassium nitrate bath. Results are shown in Table IV. In this test, a 5/8 inch steel ball is dropped on the upwardly facing outside surface of a lens mode of the glass. The height in inches at which the lens breaks is reported as the Drop Ball Height. The force in foot pounds required to break the lens can be calculated from the measured height and is also reported for each lens. It will be observed that the energy in foot pounds required to break the lens appears roughly proportional to the depth of the neutral zone of these glasses as shown in Table III. It is believed that this relationship allows a rough approximation to be made of the probable strength of glasses of the invention (Examples 1–5) under the test conditions of the Ball Drop Test.

TABLE IV

| | Resistance to Breakage as Evaluated by Drop Ball Test | |
|---|---|---|
| | Example 6 | Example 7 |
| Drop Ball Height at Failure (inches) | 227 | 380 |
| Force Required to Break Lens by Drop Ball Test (ft. lbs) | 0.68 | 1.14 |

While this invention has been described with reference to certain specific embodiments, it will be recognized by those skilled in the art that many variations are possible without departing from the scope and spirit of the invention.

We claim:

1. A chemically ion exchange-strengthened ophthalmic glass lens having a compressively-stressed, ion-exchanged surface zone that is at least 60 micrometers in depth, said lens being formed of an alkali metal oxide-silicate glass consisting essentially of alkali metal oxides selected from the group consising of (1) mixtures of sodium and potassium oxides and (2) mixtures of sodium and potassium oxides and other alkali metal oxides wherein said alkali metal oxides are present in the proportions, by weight:
   sodium oxide, about 7 to about 10 percent,
   potassium oxide about 7 to about 11 percent,
   other alkali metal oxides up to 5 percent,
   provided the proportion of the total alkali metal oxides present is up to 20 percent in combination with aluminum oxide about 0.2 to about 4 percent, and lanthanum oxide about 3 to about 15 percent, the balance of said glass being essentially silica about 60 to about 68 percent.

2. An ion exchange-strengthened ophthalmic glass lens according to claim 1 wherein said glass comprises by weight 9 percent sodium oxide, 10 percent potassium oxide, 15 percent lanthanum oxide and 0.2 percent aluminum oxide.

3. An ion exchange-strengthened ophthalmic glass lens according to claim 1 wherein said glass comprises by weight 9 percent sodium oxide, 10 percent potassium oxide, 15 percent lanthanum oxide and 2.5 percent aluminum oxide.

* * * * *